United States Patent
Bezemer

(10) Patent No.: US 10,934,492 B2
(45) Date of Patent: *Mar. 2, 2021

(54) PROCESS TO PREPARE NORMAL PARAFFINS

(71) Applicant: SHELL OIL COMPANY, Houston, TX (US)

(72) Inventor: Gerrit Leendert Bezemer, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/346,799

(22) PCT Filed: Nov. 2, 2017

(86) PCT No.: PCT/EP2017/078000
§ 371 (c)(1),
(2) Date: May 1, 2019

(87) PCT Pub. No.: WO2018/083143
PCT Pub. Date: May 11, 2018

(65) Prior Publication Data
US 2019/0264111 A1    Aug. 29, 2019

(30) Foreign Application Priority Data
Nov. 7, 2016    (EP) ..................... 16197553

(51) Int. Cl.
*C10G 45/00*    (2006.01)
*C10G 2/00*    (2006.01)
(Continued)

(52) U.S. Cl.
CPC .............. *C10G 45/00* (2013.01); *C08L 91/06* (2013.01); *C10G 2/30* (2013.01); *C10G 5/06* (2013.01);
(Continued)

(58) Field of Classification Search
CPC .......... C10G 7/00; C10G 45/00; C10G 49/22; C10G 65/16; C10G 73/44; C10G 5/06;
(Continued)

(56) References Cited

U.S. PATENT DOCUMENTS

2004/0167355 A1* 8/2004 Abazajian ................ C10G 2/32
562/93
2010/0273900 A1* 10/2010 Jacobson ............... C10G 2/342
518/712

FOREIGN PATENT DOCUMENTS

EP    2655565 A2    10/2013
EP    3040402 A1    7/2016
(Continued)

OTHER PUBLICATIONS

International Search Report and Written Opinion received for PCT Patent Application No. PCT/EP2017/078000, dated Feb. 2, 2018, 11 pages.

*Primary Examiner* — Jafar F Parsa

(57) ABSTRACT

A process for preparing normal paraffins involves separating a Fischer-Tropsch product stream to obtain first gaseous and liquid hydrocarbon streams. The first gaseous hydrocarbon stream is cooled and separated to obtain a second liquid hydrocarbon stream and a third liquid hydrocarbon stream, which are hydrogenated. The hydrogenated liquid hydrocarbon stream is separated by distillation to obtain a hydrogenated normal paraffin fraction comprising 5 to 9 carbon atoms, a hydrogenated normal paraffin fraction comprising 10 to 13 carbon atoms, a hydrogenated normal paraffin
(Continued)

fraction comprising 14 to 18 carbon atoms, and a hydrogenated normal paraffin fraction comprising 19 to 35 carbon atoms.

14 Claims, 1 Drawing Sheet

(51) Int. Cl.
    *C10G 5/06*       (2006.01)
    *C10G 7/00*       (2006.01)
    *C10G 73/44*      (2006.01)
    *C10G 49/22*      (2006.01)
    *C10G 73/36*      (2006.01)
    *C10G 45/02*      (2006.01)
    *C10G 65/16*      (2006.01)
    *C08L 91/06*      (2006.01)

(52) U.S. Cl.
    CPC ............... *C10G 7/00* (2013.01); *C10G 45/02* (2013.01); *C10G 49/22* (2013.01); *C10G 65/16* (2013.01); *C10G 73/36* (2013.01); *C10G 73/44* (2013.01); *C10G 2300/1022* (2013.01); *C10L 2200/0492* (2013.01); *C10L 2290/42* (2013.01)

(58) Field of Classification Search
    CPC .... C10G 5/02; C10G 2300/1022; C10G 2/30; C10G 73/36; C10L 2290/42; C10L 2200/0492
    See application file for complete search history.

(56) References Cited

FOREIGN PATENT DOCUMENTS

| | | |
|---|---|---|
| EP | 3040403 A1 | 7/2016 |
| NZ | 584103 A | 2/2012 |
| WO | 03070857 A1 | 8/2003 |
| WO | 2010112691 A1 | 10/2010 |
| WO | 2014095814 A1 | 6/2014 |
| WO | 2016107864 A1 | 7/2016 |

* cited by examiner

Fraction of chains with indicated chain length for first, second and third hydrocarbon stream

US 10,934,492 B2

PROCESS TO PREPARE NORMAL PARAFFINS

CROSS REFERENCE TO RELATED APPLICATIONS

This is a US national stage application of International Application No. PCT/EP2017/078000, filed 2 Nov. 2017, which claims benefit of priority of European application No. 16197553.7, filed 7 Nov. 2016.

FIELD OF THE INVENTION

The present invention relates to a process to prepare normal paraffins.

BACKGROUND TO THE INVENTION

Normal paraffins may be obtained by various processes. EP2655565 disclose a method for deriving paraffins from crude oil. Also, paraffins may be obtained using the so called Fischer-Tropsch process. An example of such process is disclosed in WO2014095814 and WO2016107864.

WO2016107864 discloses a process to prepare paraffins and waxes. In WO2016107864 a Fischer-Tropsch product stream comprising paraffins having from 10 to 300 carbon atoms is subjected to a hydrogenation step followed by separation of the hydrogenated Fischer-Tropsch product to obtain at least a fraction comprising 10 to 17 carbon atoms.

A problem of the process disclosed in WO2016107864 is that the whole Fischer-Tropsch product stream comprising paraffins having from 10 to 300 carbon atoms is used to prepare the normal paraffins having from 10 to 17 carbon atoms. For the hydrogenation of the whole Fischer-Tropsch product high temperatures are necessary which may lead to corrosion of the distillation column, heat exchanger and additional equipment. In addition, to manage the size of the product splitter and the hydrogenation unit a distillation of the feed is needed. It is an object of the invention to solve or minimize at least one of the above problems. It is a further object to provide a more efficient and simple method to prepare normal paraffins on a smaller scale.

Another object is to reduce the number of equipment used in the method to prepare normal paraffins.

Yet another object is to provide a cost-effective process, which requires less energy than the process as described in the prior art.

One of the above or other objects may be achieved according to the present invention by providing a process to prepare normal paraffins, the process comprises the steps of:
  (a) providing a Fischer-Tropsch product stream;
  (b) separating the Fischer-Tropsch product stream of step (a), thereby obtaining a first gaseous hydrocarbon stream and a first liquid hydrocarbon stream;
  (c) cooling and separating of the first gaseous hydrocarbon stream of step (b) in two or more steps to obtain a second liquid hydrocarbon stream and a third liquid hydrocarbon stream;
  (d) subjecting the second and third liquid hydrocarbon streams of step (c) to a hydrogenation step, thereby obtaining a hydrogenated liquid hydrocarbon stream;
  (e) separating the hydrogenated liquid hydrocarbon stream of step (d) by one or more atmospheric distillation(s), thereby obtaining a hydrogenated normal paraffin fraction comprising 5 to 9 carbon atoms, a hydrogenated normal paraffin fraction comprising 10 to 13 carbon atoms, a hydrogenated normal paraffin fraction comprising 14 to 18 carbon atoms, and a hydrogenated normal paraffin fraction comprising 19 to 35 carbon atoms.

It has been found according to the present invention that the process line-up has been simplified and that there is less risk of corrosion of the distillation columns, heat exchanger and additional equipment.

A further advantage is that by selecting the light wax stream the equipment size gets smaller and the separation easier. In this way the production of normal paraffins is also attractive on smaller scale. Yet a further advantage is that less energy is required for the heating and distillation.

Another advantage is that the composition of the normal paraffins can be influenced such that the normal paraffins composition will be lighter because the heavier molecules reside in the heavy wax.

BRIEF DESCRIPTION OF THE FIGURE

A more particular description of the invention, briefly summarized above, may be had by reference to the embodiments thereof which are illustrated in the appended drawings and described herein. It is to be noted, however, that the appended drawings illustrate only some embodiments of the invention and therefore not to be considered limited of its scope for the invention may admit to other equally effective embodiments.

DETAILED DESCRIPTION OF THE INVENTION

Figure 1:
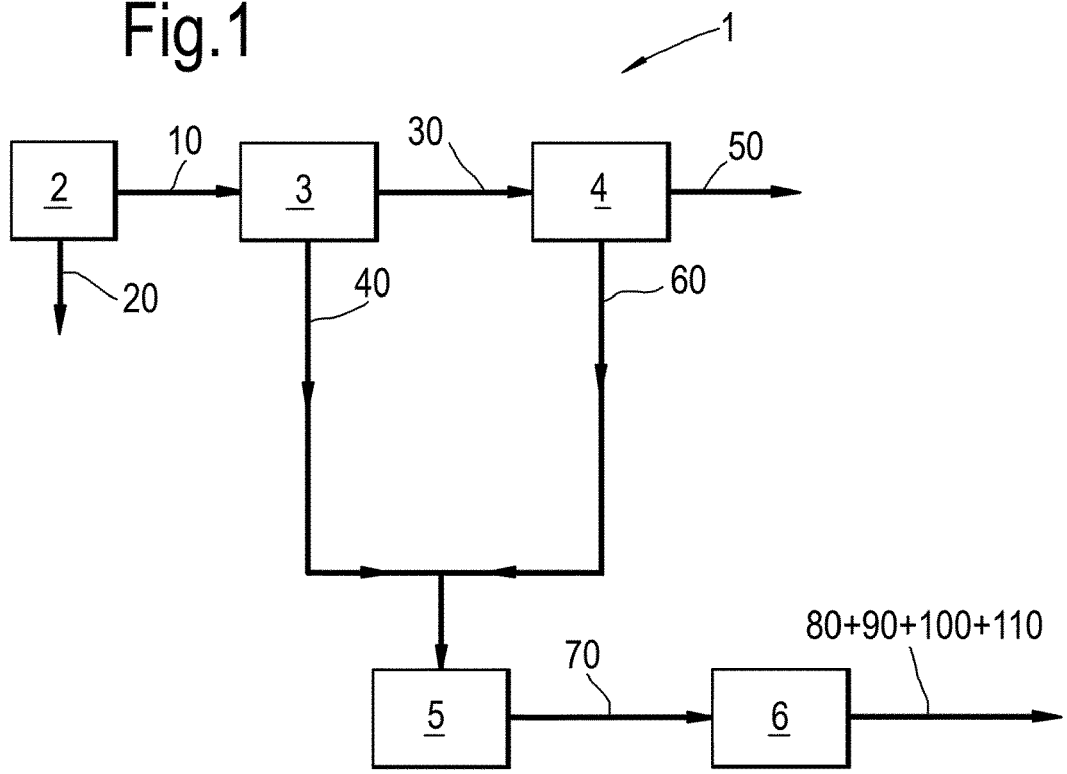
FIG. 1 shows a process scheme of a preferred embodiment of a process for preparing normal paraffins.

The Fischer-Tropsch product stream as provided in step (a) is derived from a Fischer-Tropsch process. Fischer-Tropsch product stream is known in the art. By the term "Fischer-Tropsch product" is meant a synthesis product of a Fischer-Tropsch process. In a Fischer-Tropsch process the synthesis gas is converted to a synthesis product. The synthesis gas or syngas is obtained by conversion of a hydrocarbonaceous feedstock. Suitable feedstocks include natural gas, crude oil, heavy oil fractions, coal, biomass and lignite. A Fischer-Tropsch product derived from a hydrocarbonaceous feedstock which is normally in the gas phase may also be referred to a GTL (Gas-to-Liquids) product. The preparation of a Fischer-Tropsch product has been described in e.g. WO2003/070857.

Known to those skilled in the art is that the temperature and pressure at which the Fischer-Tropsch process is conducted influences the degree of conversion of synthesis gas into hydrocarbons and impacts the level of branching of the paraffins (thus amount of isoparaffins). Typically, the process for preparing a Fischer-Tropsch derived wax may be carried out at a pressure above 25 bara. Preferably, the Fischer-Tropsch process is carried out at a pressure above 35 bara, more preferably above 45 bara, and most preferably above 55 bara. A practical upper limit for the Fischer-Tropsch process is 200 bara, preferably the process is carried out at a pressure below 120 bara, more preferably below 100 bara.

The Fischer-Tropsch process is suitably a low temperature process carried out at a temperature between 170 and 290° C., preferably at a temperature between 180 and 270° C., more preferably between 200 and 250° C.

The conversion of carbon monoxide and hydrogen into hydrocarbons in the process according to the present invention may be carried out at any reaction pressure and gas hourly space velocity known to be suitable for Fischer-Tropsch hydrocarbon synthesis. Preferably, the reaction pressure is in the range of from 10 to 100 bar (absolute), more preferably of from 20 to 80 bar (absolute). The gas hourly space velocity is preferably in the range of from 500 to 25,000 h−1, more preferably of from 900 to 15,000 h−1, even more preferably of from 1,300 to 8,000 h−1. Preferably, the reaction pressure and the gas hourly space velocity are kept constant.

The amount of isoparaffins is suitably less than 20 wt % based on the total amount of paraffins having from 9 to 24 carbon atoms, preferably less than 10 wt %, more preferably less than 7 wt %, and most preferably less than 4 wt %.

Suitably, the Fischer-Tropsch derived product stream according to the present invention comprises more than 75 wt % of n-paraffins, preferably more than 80 wt % of n-paraffins. Further, the paraffin wax may comprise iso-paraffins, cyclo-alkanes and alkyl benzene.

The Fischer-Tropsch process for preparing the Fischer-Tropsch derived product stream according the present invention may be a slurry Fischer-Tropsch process, an ebullated bed process or a fixed bed Fischer-Tropsch process, especially a multitubular fixed bed. Preferably, the Fischer-Tropsch process is a fixed bed Fischer-Tropsch process.

The product stream of the Fischer-Tropsch process is usually separated into a water stream, a gaseous stream comprising unconverted synthesis gas, carbon dioxide, inert gasses and C1 to C4, and a C5+ stream. The Fischer-Tropsch product stream comprises preferably a wax and a liquid stream. The full Fischer-Tropsch hydrocarbonaceous product suitably comprises a C1 to C300 fraction.

Lighter fractions of the Fischer-Tropsch product, which suitably comprises C1 to C4 fraction are separated from the Fischer-Tropsch product by distillation thereby obtaining a Fischer-Tropsch product stream, which suitably comprises C5 to C300 fraction.

The above weight ratio of compounds having at least 60 or more carbon atoms and compounds having at least 30 carbon atoms in the Fischer-Tropsch product is preferably at least 0.2, more preferably 0.3.

Suitably, in case of preparation of Fischer-Tropsch derived wax fraction having a congealing point of above 90° C. the above weight ratio is at least 0.5.

The weight ratio in the Fischer-Tropsch product may lead to Fischer-Tropsch derived paraffin waxes having a low oil content.

In step (b) of the process according the present invention the Fischer-Tropsch product of step (a) is separated to obtain a first gaseous hydrocarbon stream and a first liquid hydrocarbon stream. The separation in step (b) is suitably carried out at a temperature in a range of from 160 to 350° C., preferably from 190 to 250° C. and at a pressure in a range of from 5 to 150 bar. Also, the separation preferably takes place in the Fischer-Tropsch reactor.

The first gaseous hydrocarbon stream as obtained in step (b) preferably comprises 1 to about 35 carbon atoms. Suitably, the first liquid hydrocarbon stream as obtained in step (b) comprises about 16 to 90 carbon atoms. The first liquid hydrocarbon stream can be considered as heavy product that is solid and ambient pressure and temperature. It can be seen that the carbon distribution of the first liquid hydrocarbon stream and the gaseous hydrocarbon stream as obtained in step (b) overlap partially as the partitioning in the two phases is related to the vapour pressure at conditions of separation. The starting point and the end point of the carbon distribution of liquid hydrocarbon stream have were determined using the 0.5 wt % cut off point of the hydrocarbon pool. Both the end point of the carbon distribution of the first gaseous stream and the starting point of the first liquid hydrocarbon stream can differ from the mentioned 35 and 16 depending on the conditions of separation.

Hence, the end point of the carbon distribution of the first gaseous stream is in a range of from 25 to 50 carbon atoms, preferably from 35 to 40 and the starting point of the first liquid hydrocarbon stream is in a range of from 5 to 25 carbon atoms, preferably from 10 to 20 carbon atoms.

In step (c) of the process according to the present invention the first gaseous hydrocarbon stream of step (b) is cooled and separated in one or more steps to obtain a second liquid hydrocarbon steam and a third liquid hydrocarbon stream.

Cooling and separation in step (c) of the first gaseous hydrocarbon stream of step (b) is suitably carried out at a temperature in a range of from 5 to 180° C. and at a pressure in a range of from 5 to 145 bar.

Preferably, the first gaseous hydrocarbon stream of step (b) is cooled and separated in two steps in step (c).

Suitably, first the first gaseous hydrocarbon stream of step (b) is cooled to obtain a second gaseous hydrocarbon stream and a second liquid hydrocarbon stream followed by the cooling of the second gaseous hydrocarbon stream to obtain a third gaseous hydrocarbon stream and a third liquid hydrocarbon stream.

Cooling of the second gaseous hydrocarbon stream is also carried out at the conditions as described above for the cooling in step (c).

Preferably, the second liquid hydrocarbon stream comprises 5 to 30 carbon atoms. The second gaseous hydrocarbon stream suitably comprises 1 to 25 carbon atoms. Also, the third gaseous hydrocarbon stream comprises 1 to 4 carbon atoms. The third liquid hydrocarbon stream suitable comprises 3 to 20 carbon atoms.

In step (d) of the process according to the present invention the second and third liquid hydrocarbon stream of step (c) is subjected to a hydrogenation step, thereby obtaining a hydrogenated liquid hydrocarbon stream.

The hydrogenation is suitably carried out at a temperature between 200 and 275° C. and at a pressure between 20 and 70 bar. Typically, hydrogenation removes olefins and oxygenates from the fractions being hydrogenated. The amount of oxygenates in the streams prior to hydrogenation is less than 5 ppm (mg/kg). Oxygenates are preferably hydrocarbons containing one or more oxygen atoms per molecule. Typically, oxygenates are alcohols, aldehydes, ketones, esters, and carboxylic acids.

Typically, prior to the hydrogenation step in (d) the second and the third liquid hydrocarbon liquid stream are combined. Also, prior to the hydrogenation step in (d) a fraction comprising 5 to 9 carbon atoms is separated from the second and the third liquid hydrocarbon steam by atmospheric distillation.

In step (e) of the process according to the present invention the hydrogenated liquid hydrocarbon stream of step (d) is separated by one or more atmospheric distillation(s), thereby obtaining a hydrogenated normal paraffin fraction comprising 5 to 9 carbon atoms, a hydrogenated normal paraffin fraction comprising 10 to 13 carbon atoms, a hydrogenated normal paraffin fraction comprising 14 to 18 carbon atoms, and a hydrogenated normal paraffin fraction comprising 19 to 35 carbon atoms.

Preferably, the atmospheric distillation in step (e) is at a temperature in the range of 200 to 400, preferably 300 to 350° C.

The normal paraffin comprising from 10 to 13 carbon atoms is also known as light detergent fraction (LDF) and the normal paraffin comprising from 14 to 18 carbon atoms is also known as heavy detergent fraction (HDF).

Preferably, the weight fraction of the normal paraffin comprising 10 to 13 carbon atoms is between 45 and 60 wt. %, preferably 49 wt. % and the weight fraction of the normal paraffin comprising 14 to 18 is between 40 and 55 wt. %, preferably 51 wt. % based on the amount of the hydrogenated liquid carbon stream of step (d).

Also, the normal paraffin comprising 10 to 13 carbon atoms of step (e) comprises a fraction comprising 10 carbon atoms in a range of from 10 to 11 wt. %, a fraction comprising 11 carbon atoms in a range of from 30 to 32 wt. %, a fraction comprising 12 carbon atoms in a range of from 30 to 32 wt. % and a fraction comprising 13 carbon atoms in a range of from 23 to 26 wt. %.

Suitably, the normal paraffin comprising 14 to 18 carbon atoms of step (e) comprises a fraction comprising 14 carbon atoms in a range of from 25 to 27 wt. %, a fraction comprising 15 carbon atoms in a range of from 24 to 26 wt. %, a fraction comprising 16 carbon atoms in a range of from 22 to 23 wt. %, a fraction comprising 17 carbon atoms in a range of from 18 to 20 wt. % and a fraction comprising 18 carbon atoms in a range of from 4 to 6 wt. %.

FIG. 1 schematically shows a process scheme of the process scheme of a preferred embodiment of the process according to the present invention.

For the purpose of this description, a single reference number will be assigned to a line as well as a stream carried in that line.

The process scheme is generally referred to with reference numeral 1.

In a Fischer-Tropsch process reactor 2 a Fischer-Tropsch product stream is obtained. Separation into a first gaseous hydrocarbon stream 10 and a first liquid fraction 20 is accomplished in the reactor itself.

The gaseous hydrocarbon stream 10 is fed to a cooling unit 3 wherein the gaseous hydrocarbon stream is cooled and separated to obtain a second gaseous hydrocarbon stream 30 and a second liquid fraction 40. The gaseous hydrocarbon stream 30 is fed to another cooling unit 4 wherein the gaseous hydrocarbon stream 30 is cooled and separated to obtain a third gaseous hydrocarbon stream 50 and a third liquid fraction 60. The second liquid fraction 40 and the third liquid fraction 60 are fed to a hydrogenation reactor 5 to obtain a hydrogenated liquid hydrocarbon stream 70. The hydrogenated liquid hydrocarbon stream 70 is distilled in one or more atmospheric distillation columns 6 to recover a hydrogenated normal paraffin fraction 80 comprising 5 to 9 carbon atoms, a fraction 90 comprising 10 to 13 carbon atoms, a fraction 100 comprising 14 to 18 carbon atoms and a fraction 110 comprising 19 to 35 carbon atoms.

The invention is illustrated by the following non-limiting examples.

Example 1

Product Distribution of the First, Second and Third Liquid Hydrocarbon Streams

Figure 2:
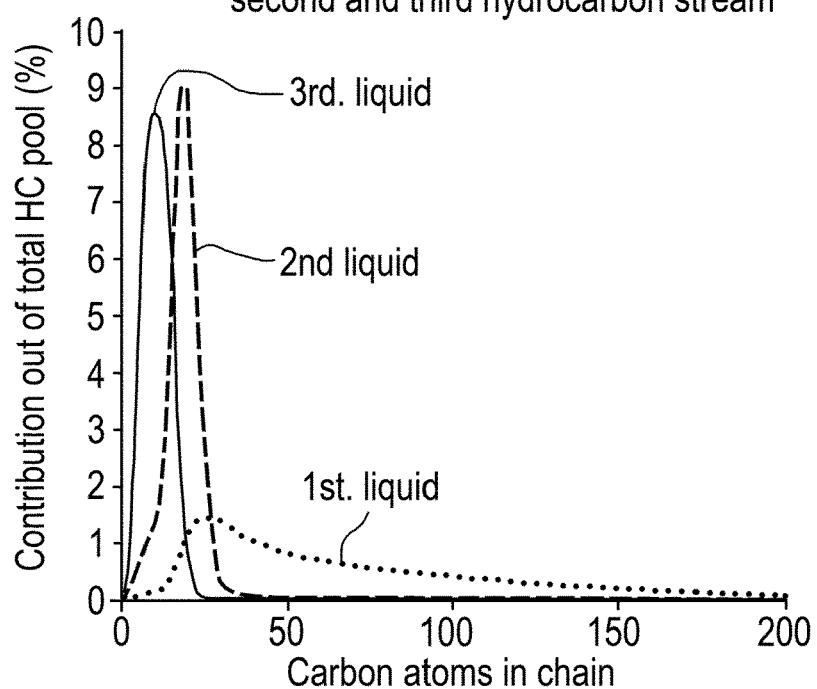
FIG. 2 show the fraction of chains with indicated chain length for first, second, and third hydrocarbon stream.

In Table 1 the flows of molecules with indicated chain length in three liquid hydrocarbon streams is given, with full distribution of the streams depicted in FIG. 2. The first liquid stream is obtained at a pressure of 55 bar and a temperature of 215° C., the second liquid stream at a pressure of 55 bar and a temperature of 159° and the third liquid stream at a pressure of 53 bar and a temperature of 15° C. It can be seen that the majority of the normal paraffins is present in the combined stream of $2^{nd}$ and $3^{rd}$ liquid.

TABLE 1

Paraffin content in $1^{st}$, $2^{nd}$ and $3^{rd}$ liquid hydrocarbon streams.

| | $1^{st}$ liquid | $2^{nd}$ liquid | $3^{rd}$ liquid | Fraction in $2^{nd}$ and $3^{rd}$ liquid |
|---|---|---|---|---|
| C10 | 2 | 2 | 35 | 94% |
| C11 | 3 | 2 | 34 | 93% |
| C12 | 3 | 3 | 33 | 92% |
| C13 | 4 | 4 | 31 | 89% |
| C14 | 6 | 5 | 27 | 85% |
| C15 | 8 | 7 | 23 | 80% |
| C16 | 10 | 9 | 18 | 73% |
| C17 | 13 | 11 | 13 | 65% |
| C18 | 15 | 12 | 9 | 57% |

Examples 2 to 3

Process to Prepare Normal Paraffins

In the comparative example 2 all the liquid hydrocarbon streams are combined and after hydrogenation used for the production of normal paraffins. The case according to the invention is represented by example 3. In Table 2 the total size of the hydrocarbon streams is indicated as well as the split in C10−, target range of normal paraffins and C18+. Comparison of example 3 (according to the invention) with comparative example 2 it can be seen that the paraffin total yields were only 16% lower. However, for the comparative example the amount of feed could be reduced with as much as 76%. This enables to build the Hydrogenation Reactor and it's surrounding equipment 4 times smaller. This brings a very significant reduction in cost to build the equipment and is combined with lower energy consumption for operation. On top of it, the very low amount of heavier hydrocarbons in example 3 enables to do the final distillation at atmospheric conditions, whereas an expensive vacuum distillation operation in combination with an atmospheric distillation (to remove the lighter components) is required for the comparative example. Hence the situation as per invention in example is much more attractive as the expensive vacuum distillation that requires high energy loads, could be eliminated.

TABLE 2

Liquid hydrocarbon streams in tpd for indicated fractions.

| Example | Liquids | C10− | C10-C17 | C18+ | Total |
|---|---|---|---|---|---|
| 2 | 1 + 2 + 3 | 193 | 307 | 1781 | 2280 |
| 3 | 2 + 3 | 180 | 258 | 97 | 535 |

Example 4

Process to Prepare C10-13 and C14 to 18 Normal Paraffins

The recovered paraffins will need further distillation to meet the product specification of the lighter C10-C13 normal paraffins and C14-C18 normal paraffins final products. The resulting compositions are given in Table 3 and Table 4. It can be seen that the compositions according to the invention are lighter compared to the comparative example.

TABLE 3

Composition of LDF for comparative example
2 and example 3 as per invention

| Ex. | C9 | C10 | C11 | C12 | C13 | C14 | Mw |
|---|---|---|---|---|---|---|---|
| 2 | 0.2 | 10 | 32.0 | 31.9 | 25.5 | 0.5 | 166.4 |
| 3 | 0.2 | 10 | 32.2 | 31.6 | 25.5 | 0.5 | 166.3 |

TABLE 4

Composition of HDF for comparative example
2 and example 3 as per invention

| Ex. | C13 | C14 | C15 | C16 | C17 | C18 | Mw |
|---|---|---|---|---|---|---|---|
| 2 | 0.5 | 23.8 | 24.3 | 23.4 | 22.6 | 5.5 | 220.4 |
| 3 | 0.5 | 26.7 | 25.7 | 22.4 | 19.3 | 5.5 | 218.9 |

In Table 5 the normal paraffin final product weight fractions are given. It can be seen that in example 3 according to the invention almost the same amount of LDF is obtained, with a lower amount of HDF. The LDF content out of the NP products increases hence from 44 to 49%. Related to the bigger market and higher premiums for LDF, it is advantaged to have a bigger fraction of the normal paraffin product as LDF.

TABLE 5

Volumetric split of NP in LDF and HDF for
comparative example 2 and example 3 as per invention

| | LDF (tpd) | HDF (tpd) | LDF | HDF |
|---|---|---|---|---|
| 2 | 122 | 155 | 44% | 56% |
| 3 | 113 | 118 | 49% | 51% |

That which is claimed is:

1. A process to prepare normal paraffins, the process comprises the steps of:
   (a) providing a volume of a Fischer-Tropsch product stream;
   (b) separating the volume of the Fischer-Tropsch product stream to form a first gaseous hydrocarbon stream and a first liquid hydrocarbon stream;
   (c) cooling and separating the first gaseous hydrocarbon stream in two or more steps to obtain a second liquid hydrocarbon stream and a third liquid hydrocarbon stream, wherein the second liquid hydrocarbon stream comprises heavier carbon atoms molecules than the third liquid hydrocarbon stream;
   (d) subjecting at least one of the second liquid hydrocarbon stream and the third liquid hydrocarbon stream to a hydrogenation step, to form a hydrogenated liquid hydrocarbon stream;
   (e) separating the hydrogenated liquid hydrocarbon stream using one or more atmospheric distillation(s), into the following fractions:
   a hydrogenated normal paraffin fraction comprising 5 to 9 carbon atoms, a hydrogenated normal paraffin fraction comprising 10 to 13 carbon atoms, a hydrogenated normal paraffin fraction comprising 14 to 18 carbon atoms, and a hydrogenated normal paraffin fraction comprising 19 to 35 carbon atoms.

2. The process according to claim 1, wherein the separating the volume of the Fischer-Tropsch product stream is performed at a temperature in a range of from 160 to 350° C. and at a pressure in a range of from 5 to 150 bar.

3. The process according to claim 1, wherein the cooling and separating of the first gaseous hydrocarbon stream is performed at a temperature in a range of from 5 to 180° C. and at a pressure in a range of from 5 to 145 bar.

4. The process according to claim 1, wherein the cooling and separating of the first gaseous hydrocarbon stream is performed in two steps.

5. The process according to claim 1, wherein prior to the hydrogenation step, the second liquid hydrocarbon stream and the third liquid hydrocarbon stream are combined.

6. The process according claim 1, wherein prior to the hydrogenation step, a fraction comprising 5 to 9 carbon atoms is separated from the second liquid hydrocarbon and the third liquid hydrocarbon stream by atmospheric distillation.

7. The process according to claim 1, wherein the atmospheric distillation is performed at a temperature in the range of 200 to 400° C.

8. The process according to claim 1,
   wherein between 45 and 60 wt. % of the hydrogenated liquid hydrocarbon stream comprises the hydrogenated normal paraffin fraction comprising 10 to 13 carbon atoms, and
   wherein between 40 and 55 wt. % of the hydrogenated liquid hydrocarbon stream comprises the hydrogenated normal paraffin fraction comprising 14 to 17 carbon atoms.

9. The process according to claim 1, wherein the hydrogenated normal paraffin fraction comprising 10 to 13 carbon atoms further comprises
   10 to 11 wt. % of paraffins having 10 carbon atoms;
   30 to 32 wt. % of paraffins having 11 carbon atoms;
   30 to 32 wt. % of paraffins having 12 carbon atoms; and
   23 to 26 wt. % of paraffins having 13 carbon atoms.

10. The process according to claim 1, wherein the hydrogenated normal paraffin fraction comprising 14 to 18 carbon atoms further comprises:
    25 to 27 wt. % of paraffins having 14 carbon atoms;
    24 to 26 wt. % of paraffins having 15 carbon atoms;
    22 to 23 wt. % of paraffins having 16 carbon atoms;
    18 to 20 wt. % of paraffins having 17 carbon atoms; and
    4 to 6 wt. % of paraffins having 18 carbon atoms.

11. The process according to claim 1, wherein the volume of the Fischer-Tropsch product stream is at a temperature in a range of from 190 to 250° C.

12. The process according to claim 1, wherein the atmospheric distillation is performed at a temperature in the range of 300 to 350° C.

13. The process according to claim 1, wherein 49 wt. % of the hydrogenated liquid hydrocarbon stream comprises the hydrogenated normal paraffin fraction comprising 10 to 13 carbon atoms.

14. The process according to claim 1, wherein 51 wt. % of the hydrogenated liquid hydrocarbon streams comprises the hydrogenated normal paraffin fraction comprising 14 to 17 carbon atoms.

* * * * *